__United States Patent Office__ 2,712,744
Patented July 12, 1955

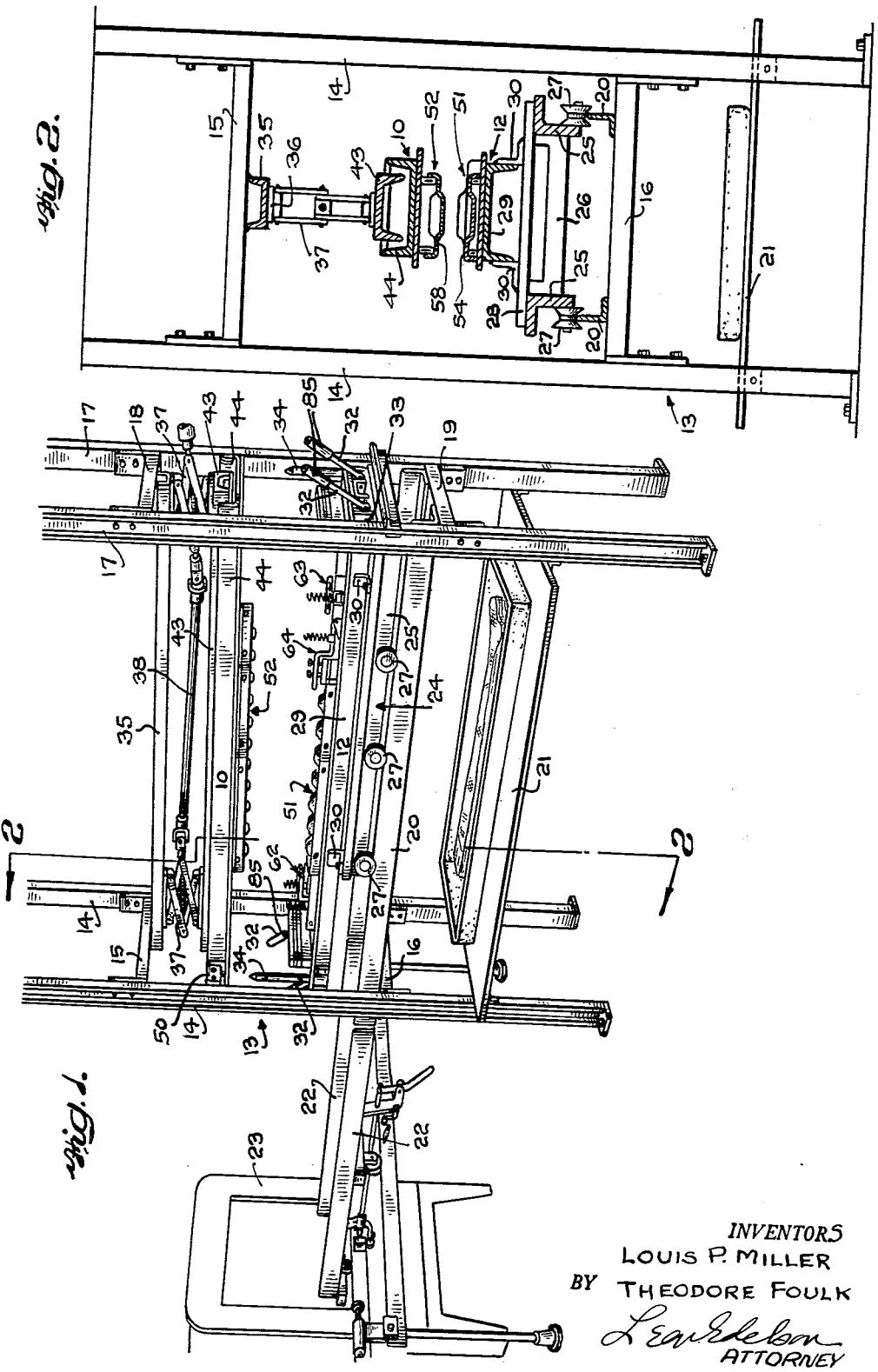

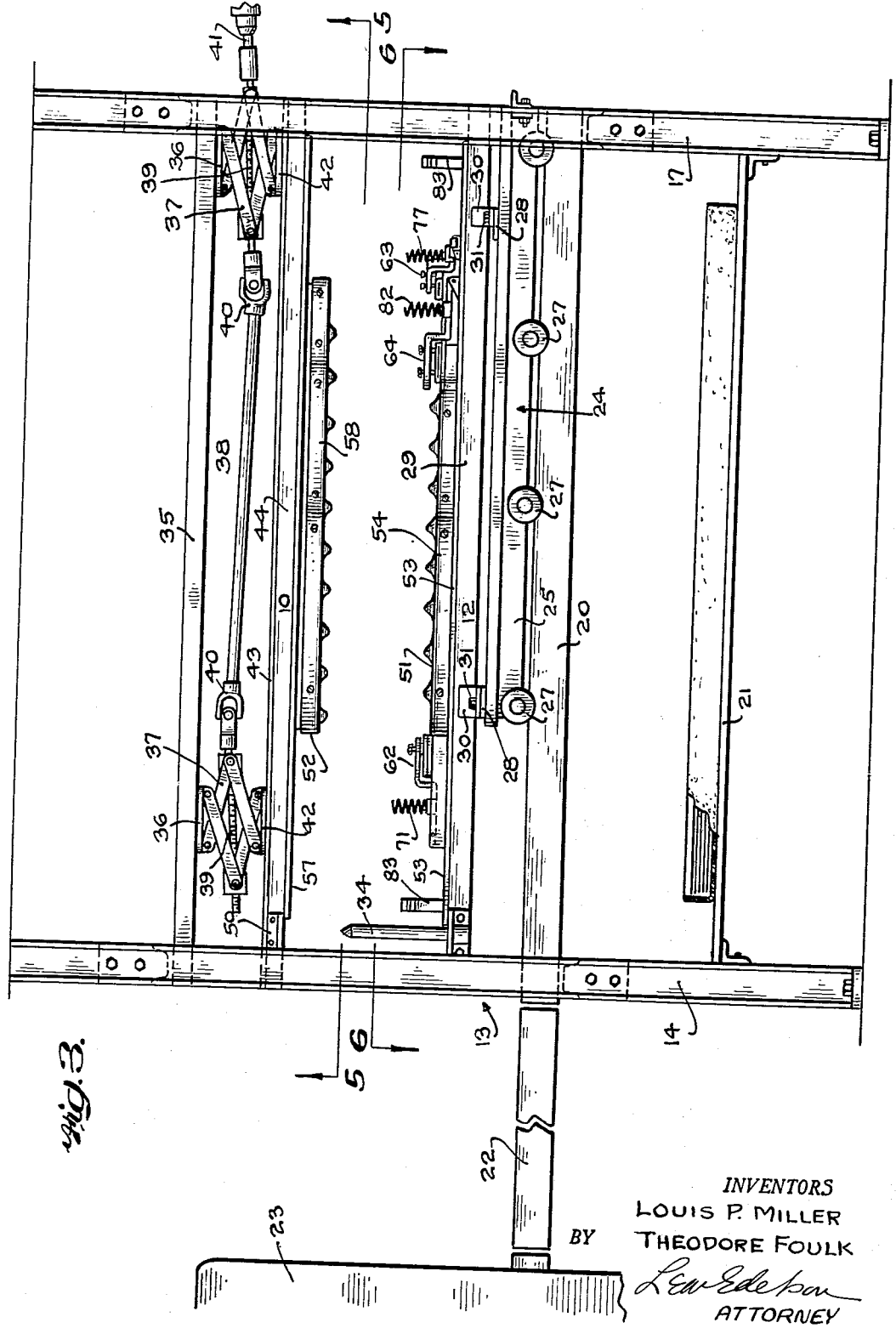

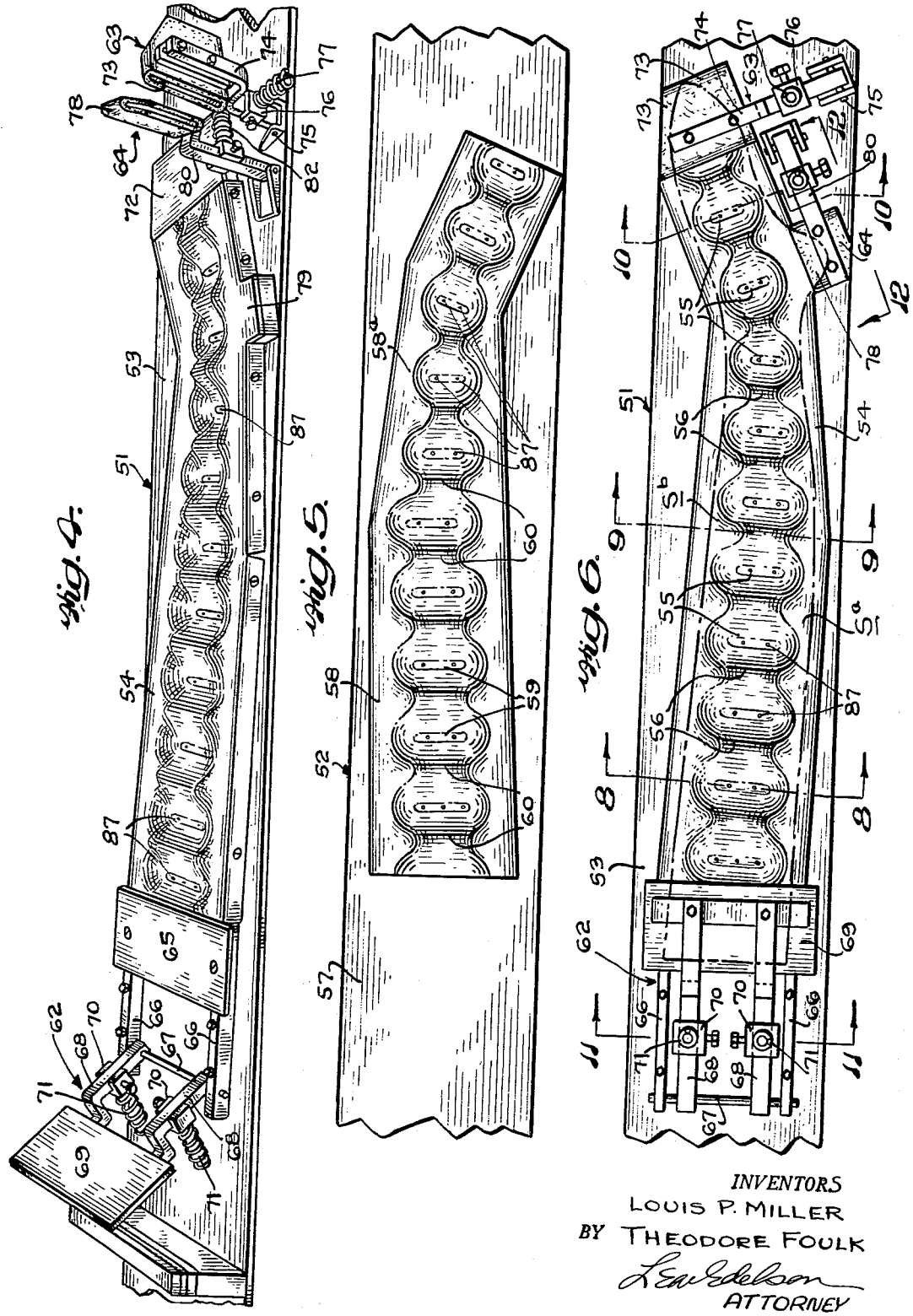

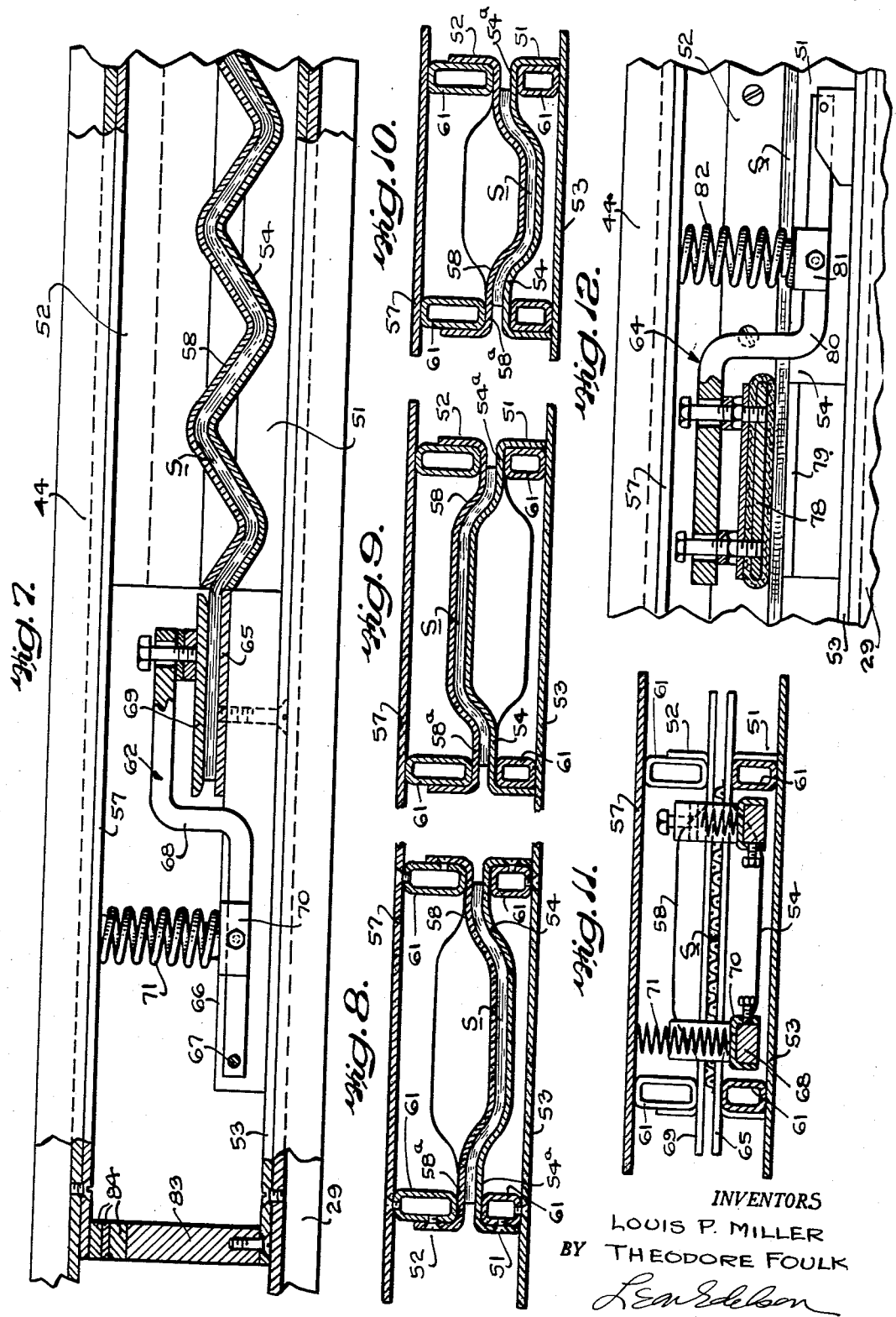

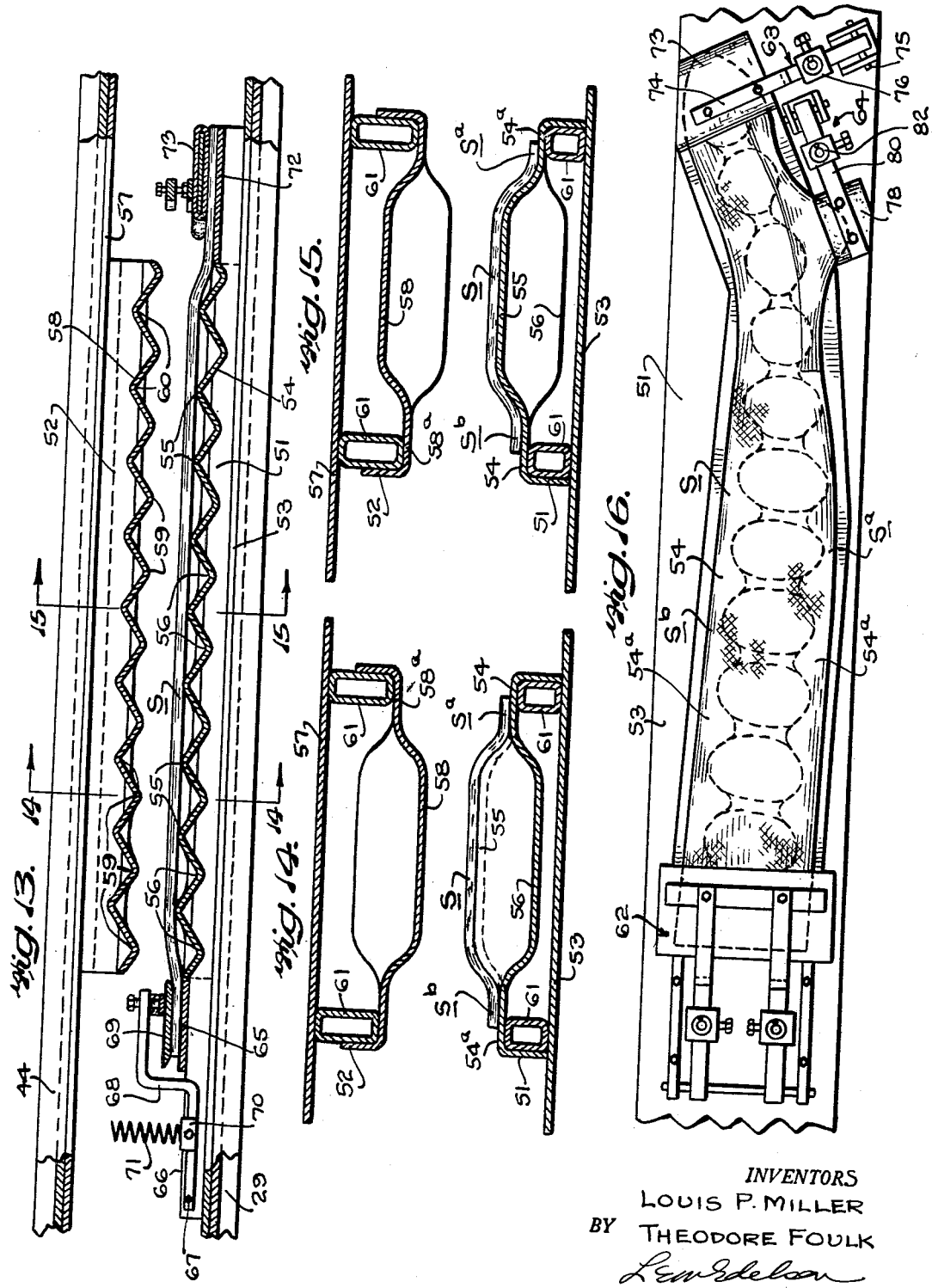

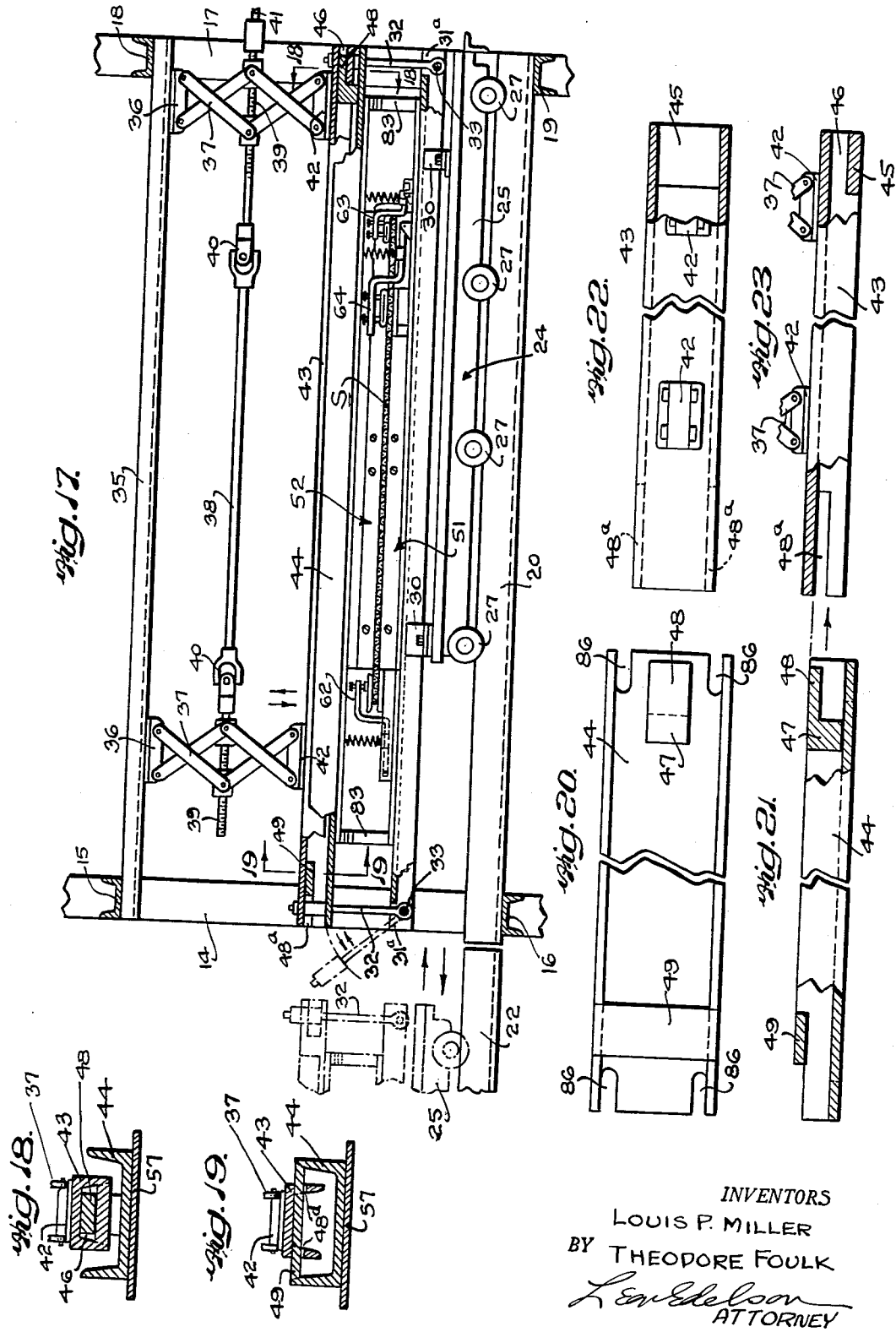

2,712,744

HOSIERY AND OTHER KNIT GOODS AND APPARATUS FOR AND METHOD OF PRODUCING THE SAME

Louis P. Miller, Plainfield, N. J., and Theodore Foulk, Flourtown, Pa., assignors to Sanson Hosiery Mills, Inc., Philadelphia, Pa., a corporation of Delaware Application May 27, 1953, Serial No. 357,692

32 Claims. (Cl. 66—178)

This invention relates generally to the manufacture of hosiery and other articles of wearing apparel which are designed to be form-fitting in shape and which are knitted of synthetic thermoplastic yarn, such as nylon and the like, and more particularly to improvements in the apparatus for and method of producing such articles.

More specifically, it is among the principal objects of the present invention to provide a commercially satisfactory apparatus for and method of producing hosiery and other articles which are knitted of synthetic thermoplastic fiber or yarn, such as nylon, and in which the interknitted loops are permanentized into a set form, as described in United States Letters Patent No. 2,591,566, granted April 1, 1952, to C. W. Livingston, so as to utilize to best advantage the inherent superior bending elasticity of such synthetic fibers or yarns.

In the production of full-fashioned hosiery knit of synthetic thermoplastic yarns, such as nylon, which full-fashioned hosiery is characterized by the provision of a rear seam extending longitudinally the full length of the stocking, it has been found desirable to limit the stretching of the interknitted loops of the fabric into their permanently set form as set forth in the aforesaid Letters Patent No. 2,591,566 to opposed side regions of the stocking extending respectively coursewise from wale or needle lines spaced to either side of the front fold line of the stocking to wale or needle lines spaced to either side of the rear seam thereof. In other words, the interknitted loops which are included in the seam and in the wales of the stocking immediately adjacent opposite sides of the rear seam, as well as the interknitted loops which are included in the several wales which embrace the front fold line of the stocking, are not stretched to a permanentized set, but instead are permitted to remain relaxed as in a conventionally produced stocking. The primary advantage resulting from such relaxation of the interknitted loops in the immediate region of the seam is that the seam is freed of any tendency to become snaky and so pull the stocking out of shape, i. e., into a biased condition. Similarly, relaxing the interknitted loops in the region of the front fold line of the stocking also prevents any tendency of the stocking fabric to become biased in its front region, although the biasing tendency in this frontal region is far less pronounced than in the seam region. In some cases, the biasing tendency along the front fold line of the stocking is of such little consequence that it may be unnecessary to effect relaxation of the interknitted loops in the region of the front fold line.

Having the foregoing in mind, it will be appreciated that an important objective of the present invention is to provide an apparatus which not only makes possible the economical quantity production of hosiery of the character described in the aforesaid Letters Patent No. 2,591,566, but also insures the provision in such hosiery, when made according to full-fashioned specifications, of rear seams which do not deviate from a straight line, which do not tend to pull the stocking out of shape and which are sightly and pleasing in appearance.

Still another and important object of the present invention is to provide an apparatus which is capable of efficiently and expeditiously processing at one time and in such manner a batch of knitted hosiery that corresponding predetermined limited portions thereof have their interknitted loops permanently set to an increased walewise length greater and to a coursewise width less than the length and width of the said loops as originally knitted, whereby all of the hosiery in the processed batch have uniformly imparted thereto an increased coursewise elasticity.

A still further object of the present invention is to provide an apparatus for preliminarily imparting to a batch of knitted hosiery a controlled degree of walewise stretch in predeterminedly selected portions of the hosiery and for maintaining said walewise stretch in said batch of hosiery while the same is subsequently subjected to an aqueous medium at a predetermined elevated temperature sufficient to permanentize the shape and set of the interknitted loops of the stretched portions of the hosiery.

Still other objects of the invention are to provide in an apparatus of the character aforesaid means for insuring uniform distribution of the heating medium to the batch of hosiery being processed, means for limiting the stretching operation to certain selected portions of the hosiery while permitting other portions thereof to remain completely relaxed not only during the stretching operation, but also during the heat treating operation for permanentizing the shape and set of the loops or stitches of the hosiery fabric, and means for effecting ready transfer of the stretched batch of hosiery into and out of an autoclave wherein the hosiery is subjected to action of a suitable heating medium at a temperature sufficiently high and for a period sufficiently long to insure the permanent setting of the interknitted loops in the walewise stretched portions of the hosiery as well as the permanent setting of the interknitted loops in the relaxed portions of the hosiery, as, for example, those which are included in the wales or needle lines immediately adjacent either side of the rear seams.

A further and important objective of the present invention is the provision of a knitted stocking, which while produced basically in accordance with the principles of the invention shown and described in the aforesaid Livingston patent, is characterized by the fact that the walewise stretched portions thereof are restricted to areas which terminate short of and so do not embrace its rear seam, in consequence of which the stocking fabric in the immediate region of the seam is completely relaxed and thereby extends in undeviating straight line condition along the full length of the stocking.

By effecting relaxation of the interknitted loops not only along the rear seam of the stocking, but also along its frontal fold line, sometimes referred to in the art as the shin fold, thereby confining the walewise stretch and coursewise contraction of the interknitted loops to the intervening opposite side portions of the knitted stocking, the overall length of the stocking is maintained to a dimension which approximates that of the conventionally produced stocking, the walewise stretched portions thereof, while in effect held to the length of the relaxed portions, being bellied to such slight extent as to be hardly discernible to the eye. It is accordingly an object of the present invention to provide a stocking having all of the desirable characteristics of that described in the aforesaid Livingston patent but which in overall length approximates that of a conventionally produced stocking.

Other objects and advantages of the present invention will appear more fully hereinafter, it being understood that the invention consists substantially in the combination, construction, location and relative arrangement of the several parts of the apparatus of the character above described, in the method of producing stockings and in the construction of the stocking itself, all as described in detail in the following specification, as shown in the accompanying drawings and as finally pointed out in the appended claims.

In the accompanying drawings, which are illustrative of a preferred construction of apparatus for producing stockings and other form-fitting garments knitted of synthetic thermoplastic yarn, such as nylon, in accordance with the principles of the present invention:

Figure 1 is a perspective view generally showing the apparatus in association with an autoclave wherein the articles are heat-treated to permanentize the knitted loops of the processed article to their desired shape and set;

Figure 2 is a vertical sectional view as taken along the line 2—2 of Figure 1;

Figure 3 is a side elevational view of the apparatus showing the upper and lower dies for stretching the knitted article in vertically spaced relation;

Figure 4 is a perspective view of the lower die with the article-holding clamps thereof in opened condition;

Figure 5 is a plan view of the upper die complemental to that shown in Figure 3; this view being taken along the line 5—5 of Figure 3;

Figure 6 is a plan view of the lower die of Figure 4 but showing the article (hosiery) clamped in position thereon, this view being taken along the line 6—6 of Figure 3;

Figure 7 is a longitudinal sectional view of the left hand portions of the complemental upper and lower dies of Figure 3, but showing the same in nested relation with the articles being processed clamped therebetween;

Figures 8, 9 and 10 are transverse sectional views of the nested dies as taken along the lines 8—8, 9—9 and 10—10 of Figure 6;

Figure 11 is a transverse sectional view of the nested dies and one of the holding clamps (for the stocking welt) as taken along the line 11—11 of Figure 6;

Figure 12 is a sectional view of the nested dies and another of the holding clamps (for the stocking heel) as taken along the line 12—12 of Figure 6;

Figure 13 is a longitudinal sectional view of the complemental upper and lower dies, showing the dies in separated relation and a batch of hosiery to be processed clamped to the lower die;

Figures 14 and 15 are transverse sectional views as taken respectively along the lines 14—14 and 15—15 of Figure 13;

Figure 16 is a top plan view of the lower die with a batch of hosiery clamped thereto as shown in Figure 13;

Figure 17 is a side elevational view of the apparatus of Figure 1 showing the upper die pressed downwardly against the lower die to stretch the hosiery disposed between the dies;

Figures 18 and 19 are transverse sectional views as taken respectively along the lines 18—18 and 19—19 of Figure 17;

Figure 20 is a top plan view of the support for the upper die;

Figure 21 is a side elevational view, partly in section, of the support shown in Figure 20;

Figure 22 is a bottom plan view of the vertically movable supporting platen for the upper die assembly; and Figure 23 is a side elevational view, partly in section, of the platen shown in Figure 22.

Referring now to the drawings, and more particularly to Figures 1, 2 and 3 thereof, it will be observed that the apparatus of the present invention generally comprises a pair of relatively movable die-supporting platens 10 and 12, both of which are supported in horizontally disposed, parallel relation within an open framework 13 suitably formed of structural steel members including a pair of front end posts 14—14 interconnected by transversely extending members 15—16 and a pair of rear end posts 17—17 also interconnected by transversely extending members 18—19. The topmost transversely extending members 15 and 18 are interconnected by a longitudinally extending channel member 35 centrally disposed between the opposite side limits of the framework 13. This framework may be otherwise suitably reinforced and rigidified and, if desired, may be provided with a work-supporting table 21 disposed at a convenient elevation above the floor.

Secured to and supported by the lower transverse members 16 and 19 are a pair of rail-forming angle members 20—20 respectively disposed in horizontal alinement with a pair of similar rail-forming members 22—22 supported in advance of the fore end of the framework 13 and terminating just short of the entrance into a suitable autoclave 23 within which the articles to be processed are subjected to the action of a suitable heating medium, for example, steam at a temperature sufficiently high and for a time sufficiently prolonged to insure permanent setting of the knitted fabric into its final desired form. The autoclave, which forms no part of the present invention, is internally provided with a pair of rails respectively in continuation of the rails 22—22 and is of an internal dimension adequate to receive a work-supporting carriage, to be described in detail hereinafter, which is shiftable along the aforesaid alined rails from an original position within the framework 13 into the autoclave and thence back to its original position.

The work-supporting carriage, designated generally by the reference numeral 24, is shown most clearly in Figures 1, 2, 3 and 17, and comprises a pair of laterally spaced, longitudinally extending, parallel members 25—25 suitably interconnected by cross braces 26, each of the members 25—25 being provided with a plurality of suitably journalled freely revoluble grooved wheels 27 which ride upon the upper edges of the rails 20—20. Extending across the top flanges of the rails 20—20 are a pair of flat plates 28—28 which in turn support a longitudinally extending inverted channel member 29 disposed centrally between the wheeled members 25—25, this channel member 29 being rigidly secured in position by angle clips 30 respectively welded to the member 29 and secured to the members 25—25 by bolts 31. It will be noted that while the inverted channel member 29 is approximately coextensive in overall length with that of the open framework 13, the top web of said member is cut away at each of its opposite ends, as at 31ª, to provide swing room for a pair of clamp rods 32—32, secured to a pivot rod 33 extending transversely through the opposite side flanges of the channel member 29. Secured to diagonally opposite ends of the inverted channel member 29 are a pair of upstanding indexing pins 34—34, the function of which, together with that of the clamp rods 32—32, will be explained later in this specification. It will be apparent from the foregoing that while the work-supporting carriage 24 comprising, in assembly, the wheeled rails 25—25 and the inverted channel member 29, is shiftable in a horizontal plane along the tracks 20—20 and the extensions thereof leading into the autoclave, it is vertically immovable and thus serves, when held against horizontal shifting, as the fixed support for the stationary lower die assembly of the apparatus.

Referring now to the supporting structure for the vertically movable upper die assembly, it will be noted that the fore and aft transverse members 15 and 18 of the framework 13 support the longitudinally extending channel-shaped member 35 to which in turn are secured the upper flat pads 36—36 of a pair of lifting jacks 37—37, preferably of the scissors type. These lifting jacks are suitably interconnected for conjoint operation by a shaft 38 extending between the operating screws 39—39 of the jacks, the opposite ends of the intervening shaft 38 being respectively connected to the jack-operating screws by universal couplings 40—40 of any suitable type. The aft jack 37 is provided with an operating shaft 41 which may be driven manually or by power, as by an electric motor (not shown).

Secured to and carried by the lower flat pads 42—42 of the lifting jacks is a longitudinally extending inverted channel member 43, this latter member being in vertically spaced longitudinal alinement with the channel member 29 of the wheeled work-supporting carriage 24 hereinbefore described. As will be apparent, upon rotation in one direction or the other of the operating shaft 41 for the lifting jacks 37—37 the latter conjointly operate to raise or lower the upper channel member 43 relatively to the bottom channel member 29, without disturbing their parallel relationship.

Removably supported by the relatively movable upper channel member 43 is an upwardly presenting channel member 44, it being noted that this latter member is of approximately the same size as the channel member 29 and that the two channel members 29 and 44 are reversely disposed so that their intermediate web portions present toward each other and are respectively disposed in horizontal parallel planes.

Figures 17 to 23 inclusive show a preferred arrangement for removably supporting the channel member 44 upon the longitudinally extending channel member 43 fixed to the lower pads of the lifting jacks. Thus, it will be noted that the aft end of the topmost channel member 43 is provided with a cross bar 45 to form an open-ended socket 46 immediately beneath the top web portion of the member 43, while the corresponding aft end of the channel member 44 is provided with a welded lug 47 having a freely projecting tongue 48 adapted to be horizontally projected into the socket 46 aforesaid. The fore end of the top-most channel member 43 is provided in each of its opposite side flanges with a longitudinally extending notch 48ª, while the corresponding fore end of the channel member 44 is provided with a cross-bar 49 adapted to be projected edgewise into the notches 48—48 when the member 44 is shifted horizontally with respect to the member 43. It will be understood, of course, that assembly and disassembly of the members 43 and 44 is effected only when these members are horizontally alined as shown conjointly in Figures 21 and 23, the desired assembly being effected when the member 44 is horizontally shifted toward the rear end of the apparatus and their disassembly when the member 44 is withdrawn from the member 43 by movement of the former toward the front end of the apparatus. Normally, such coupling and uncoupling of the channel members 43 and 44 takes place only when the lifting jacks 37—37 are extended, as shown in Figure 17, to present the coacting upper and lower dies (which will be presently described) in operative engagement with one another.

In order to insure vertical registry of the die-supporting members 29 and 44 when the latter is pressed downwardly under the force of the jacks 37—37, the upper member 44 is provided at diagonally opposite corners thereof with apertured brackets 50—50 designed respectively to receive the indexing pins 34—34 which are secured to corresponding diagonally opposite corners of the lower member 29. These indexing pins and their associated apertured brackets are so located relatively to the channel member 43 as not to interfere with horizontal shifting movement of the member 44 relatively to the member 43 during the operations of coupling and uncoupling said members 43 and 44.

These upper and lower dies are respectively carried by the channel members 29 and 44, the former forming part of the wheeled carriage 24 and the latter part of the jack-supported super-structure. While the upper member 44 (and its associated die) is only capable of vertical movement under the influence of the upward pull or downward thrust of the jacks 37—37, the lower member 29 (and its associated die) is only capable of horizontal shifting movement along the tracks which support the wheeled carriage for said lower member 29.

Figures 4 and 5 show the lower and upper die assemblies 51 and 52 which are respectively carried by the lower and upper members 29 and 44. Referring first to the lower die assembly 51 of Figure 4, it will be noted that it includes a base plate 53 which is adapted to be secured flatwise to the top surface of the member 29 and which in turn suitably supports a die-plate 54 of predetermined shape and form. As most clearly appears in Figures 4, 7 to 10 and 13 to 14, this die-plate 54 is corrugated to provide alternating transversely extending ridges 55 and depressions 56, with the ridges projecting substantially above and the depressions projecting substantially below the horizontal plane of the marginally extending flat portion 54ª of the die-plate.

The upper die assembly 52 (shown in Figure 5) likewise includes a base plate 57 which is adapted to be secured flatwise to the under surface of the member 44 and which in turn suitably supports a die-plate 58 of predetermined shape and form. This die-plate 58 is also corrugated to provide alternating transversely extending ridges 59 and depressions 60 which are respectively generally complemental to those of the lower die-plate 54, the general arrangement being such that the ridges of each die plate nest in the depressions of the other die-plate when the two die-plates are brought together, as shown in Figures 7 to 10. As in the case of the lower die-plate 54, the upper die-plate 58 is also provided with a marginally extending flat portion 58ª.

The die-plates 54 and 58 are each externally shaped to conform more or less closely with the general outline shape of the article to be treated in the apparatus of the present invention, which article is shown for purposes of illustration as being a stocking or group of stockings, designated S in Figures 6 to 13. Thus, as most clearly appears in Figures 4, 6 and 16, as well as in Figure 5, the lower die-plate 54 and the upper die-plate 58 are each angularly offset at corresponding ends thereof in correspondence with the angular offset which the foot of a stocking forms with respect to the leg thereof.

Any suitable means may be employed for securing the upper and lower die-plates to their respective supporting base plates. Preferably, the die-plates are flanged along their opposite longitudinally extending edges to strengthen and rigidify the same, such flanges being shown most clearly in Figures 14 and 15. In order to insure uniform distribution of heat throughout the entire extent of each die-plate, particularly along the flat marginal portions thereof, the die-plates are each secured to its supporting base plate through the intervention of hollow members 61 of rectangular cross-section, these members being respectively secured to the side flanges of the die-plates and to the base plates.

As has been previously indicated, the apparatus of the present invention is designed to stretch the knitted fabric of the article undergoing treatment so as to increase the walewise length and decrease the coursewise width of the interknitted loops as compared with the length and width of said loops formed upon the knitting machine and to hold the knitted fabric in its walewise stretched condition while the same is subjected to heat treatment to permanentize the stretched condition of the fabric. The stretching is effected by bringing the corrugated upper and lower die-plates into nested relation while the stocking is held flatwise across the corrugations of the lower die-plate, the stretching being effected by the upper die-plate as it is pressed downwardly into nested relation with respect to the lower die-plate. Of course, during this operation the opposite ends of the stocking must be held relatively fixed in position so that the desired walewise stretching occurs in that portion of the stocking which extends between its points of fixed securement.

In order to hold the stocking at its desired points of securement, as, for example, at the top of the welt, the tip of the toe and the pocket of the heel, the lower die-plate is provided with three sets of clamps respectively designated 62, 63 and 64. The clamp 62, which is designed to clamp the welt of the stocking to the lower die assembly includes a bottom clamp plate 65 which is mounted immediately adjacent one end of the die-plate 54 with its flat upper surface coplanar with the marginally extending flat portion 54ª of the die-plate 54. This plate 65 is preferably supported upon a pair of laterally spaced bars 66—66 suitably secured to the base plate 53. Extending between the freely extending ends of the bars 66—66 is a pivot rod 67 to which are secured arms 68—68, the free ends of which are offset and loosely carry a top clamping shoe 69. When the arms 68—68 are swung from their position shown in Figure 4 into their positions shown in Figures 6 and 13 the clamping shoe 69 overlies the bottom clamp plate 65 and serves conjointly with the latter to clamp the welt ends of the stockings between the plates 65 and its overlying shoe 69. Adjustably mounted upon each of the arms 68—68 is a U-shaped bracket element 70 which in turn carries a relatively strong coiled compression spring 71 designed to project freely above its supporting bracket when the clamp assembly is swung into its operative position shown in Figures 6, 13 and 16. As the upper die assembly is pressed downwardly by operation of the jacks 37—37 the base plate 57 of the upper die engages the free end of the coil springs 71—71 and so resiliently forces the shoe 69 into clamping engagement with coacting plate 65. By slidably adjusting the coil spring supporting bracket elements 70—70 lengthwise of their supporting arms 68—68, the clamping pressure exerted upon the shoe 69 may be varied.

The toe clamp 63 is of a construction generally similar to that of the welt clamp 62 and includes a fixed plate 72 disposed immediately adjacent the angularly offset end of the corrugated lower die-plate 54 with the top surface of said plate 72 horizontally flush with the top surface of the marginally extending flat portion 54ª of the die-plate. Operatively associated with the fixed plate 72 is a clamping shoe 73 carried by an offset portion of an arm 74 pivoted, as at 75, to one side of the plate 72. The arm 74 is generally similar to the arms 68—68 of the welt clamp and is fitted with a slidably adjustable bracket element 76 upon which is mounted a freely projecting coiled compression spring 77 having the same function as the coil springs 71—71 of the welt clamp. Preferably, in order to provide a sure grip upon the toe part of the stocking which is clamped between the plate 72 and its associated clamping shoe 73, the latter is wrapped with a covering of material having good friction properties, thereby reducing the tendency of the clamped toe part of the stocking from slipping free of the toe clamp when the stocking is subjected to walewise stretching.

The stocking heel clamp 64 is generally similar to the toe clamp 63, the difference between the two being principally in the different orientation of the heel clamp to permit its clamping shoe 78 to be swung into clamping engagement with the top surface of a fixed plate 79 extending laterally from one side of the lower die plate. As in the welt and toe clamps, the heel clamp also includes a pivoted arm 80 upon which is secured a slidably adjustable bracket element 81 mounting a freely projecting coiled compression spring 82. The heel clamping shoe 78 may also be wrapped, if desired, with a covering of cloth or other material affording good frictional contact with the heel portion of the stocking clamped between the extension 79 and its associated clamping shoe 78.

As most clearly appears in Figures 13 to 16, inclusive, the stocking to be stretched in the apparatus of the present invention is initially laid over the lower die-plate in unstretched condition, just sufficient tension being imparted thereto to free it of wrinkles. When properly disposed upon the lower die-plate, the welt, toe and heel parts of the stocking respectively lie upon the fixed plates 65, 72 and 79 of the several clamping units for subsequent engagement by the clamping shoes 69, 73 and 78 when the latter are swung downwardly into their clamping positions shown in Figures 13 and 16. Preferably, a group of stockings are stretched at one time, usually about eighteen stockings folded flat and laid upon one another.

It is important to note that the transverse corrugations in the coacting die plates are all relatively of such dimension as not to extend across the full width of the stocking. As best appears from an examination of Figures 14, 15 and 16, the longitudinally extending opposite marginal portions of the stockings S respectively extend beyond the opposite extremities of the corrugations and lie upon the marginally extending flat portion 54ª of the lower die-plate. Thus, the rear edge portion Sª of the stocking, which in the case of a full-fashioned stocking includes the rear seam thereof, extends marginally beyond one side of the corrugations, while the front edge portion Sᵇ of the stocking, which forms what is known in the hosiery industry as the shin fold of the stocking, extends marginally beyond the opposite side of the corrugations. The central portion of the stocking (or group of stockings) is thus raised somewhat out of its normal horizontal plane to form a transverse arch which extends continuously for substantially the full length of the stocking.

It will be understood, of course, that the initial disposition of the stockings upon the lower die-plate is effected while the upper die-plate is in its elevated position, as shown in Figure 3. After the stockings have thus been properly laid upon the lower die plate and the clamps 62, 63 and 64 have been swung into their clamping positions shown in Figure 16, the jacks 37—37 are operated to lower the upper die assembly into its operation shown in Figure 17. Of course, during the operations of raising and lowering the upper die assembly, and while said upper die assembly is in its elevated position shown in Figure 1, the channel member 44 which supports the upper die plate 58 is coupled to and becomes a unit with the channel member 43 which is permanently secured to the lower pads of the lifting jacks 37—37.

When the upper die assembly is lowered into its operative position shown in Figure 17, the transverse ridges of the upper die-plate 58 nest in the complementally shaped depressions of the lower die-plate 54, while the transverse ridges of the lower die-plate correspondingly nest in the complementally formed depressions of the upper die-plate. As the corrugated upper and lower die-plates are thus brought into meshing relation to engage opposite surfaces of the group of stockings S disposed upon the lower die-plate, the supporting base plate 57 for the upper die assembly engages the several upstanding coil springs 71, 77 and 82 of the welt, toe and heel clamps and thereby resiliently presses these clamps into firm clamping engagement with the welt, toe and heel parts of the stockings, thus securing the latter against displacement as the complementally corrugated die-plates are pressed together into their relation shown in Figures 7 to 12, inclusive. The coil springs 71, 77 and 82 are each normally of such effective length as to be engaged by the base plate 57 just prior to engagement of the upper die-plate 58 with the stockings extending flatwise across the lower die-plate 54, thereby insuring positive clamping of the stockings to the lower die-plate preliminarily to intermeshing of the corrugated dies for walewise stretching of the stockings. As has been previously indicated, the pressure exerted upon the stockings by the upper shoes of the several clamps may be varied as desired by adjusting the coil spring supporting brackets longitudinally in one direction or another along the arms which carry said brackets. In order to limit the compressive force exerted by the clamps suitable stops 83 may be provided as shown in Figures 3, 7 and 17, said stops being suitably secured in upstanding relation at opposite ends of the support for the lower die assembly. The upper ends of these stops are engaged by the support for the upper die assembly and so limit downward movement of the latter. In order to vary the motion-limiting action of these stops 83, their effective height may be changed by means of shims 84 which may be added to or removed from the top ends of the stops.

It will be apparent that when the complementally corrugated die-plates are pressed into their nested relation shown in Figures 7 to 12, the portion of the stockings which is disposed between the meshed corrugations is stretched walewise, thereby increasing the walewise length and decreasing the coursewise width of the interknitted loops of the fabric embraced between the meshed corrugations of the upper and lower plates. The opposite marginal edge portions of the stockings which are respectively embraced between the flat marginal surfaces of the upper and lower die-plates are not longitudinally stretched, these marginal portions of the stocking, namely, that which includes the rear seam of the stocking and that which constitutes the shin fold thereof, being so relaxed that the interknitted loops thereof have little or no walewise stretch imparted thereto. Consequently, when the stocking is subsequently subjected to heat treatment to permanentize the shape and relative position of all of the several interknitted loops of the stocking considered in its entirety, those interknitted loops which are included in the opposite longitudinally extending marginal portions of the stocking are not appreciably stretched, if at all, and so tend to hold the stocking to approximately the same length as that of a corresponding stocking no part of which was subjected to walewise stretching. The intermediate portion of the stocking is, however, substantially stretched, with the result that the interknitted loops of such intermediate part of the stocking are all of increased walewise length and decreased coursewise width as compared with the length and width of said loops as originally formed upon the knitting machines.

In order to permanentize the set of the interknitted loops of the stocking fabric, including not only the walewise stretched loops confined within the limited area subject to the stretching action of the intermeshing corrugations of the die-plate 54 and 58 when the latter are brought together as shown in Figures 7 and 17 but also the loops of the relatively relaxed or unstretched portions S$^a$ and S$^b$ of the stockings as shown in Figures 6 and 16, the upper and lower die assemblies with the stockings clamped therebetween are shifted as a unit from the framework 13 along the tracks 20—20 and 22—22 into the autoclave 23 wherein the stockings are subjected to the action of a suitable heating medium, for example, steam or heated air at a temperature sufficiently high and for a period of time sufficiently prolonged to insure permanent setting of the loops of the stocking fabric into their desired form and shape. In order to expeditiously effect the shifting of the walewise stretched stockings from the framework 13 into the autoclave 23, the upper and lower assemblies are releasably locked together by means of swingable clamp rods 32—32 hereinbefore referred to. These clamp rods are arranged in pairs at opposite ends of the longitudinally extending channel member 29 which supports the lower die assembly 51, the paired rods being secured to their pivot shaft 33 as hereinbefore described and each of the rods being provided with an axially adjustable locking member, such as a tubular nut 85, which is threaded upon the free end of its associated clamp rod. The shank portions of the clamp rods are adapted to be accommodated within notches 86 suitably provided therefor in the opposite ends of the channel member 44 which supports the upper die assembly. It will be apparent that when the clamp rods 32 are swung into position to locate their shanks within the notches 86 of the member 44, the nuts 85 may then be adjusted into position to securely lock the channel member 44 to the channel member 29 and so hold the die assemblies closed together as shown in Figures 7 and 17.

When the upper and lower die assemblies are thus locked together by the clamp rods 32 they become a fixed part of the wheeled carriage 24 and are shiftable with the latter free of the framework 13 along the tracks 20—20 and 22—22 into the autoclave 23. It will be noted that when the upper and lower die assemblies are coupled together as just described and are so conjointly supported upon the wheeled carriage 24, the wheeled assembly is disengaged from the jack-supported channel member 43 simply by horizontal shifting of the assembly toward the autoclave 23. As such horizontal shifting is effected, the tongue 48 and the cross bar 49 of the channel member 44 are respectively disengaged from the socket 46 and the notches 48$^a$—48$^a$ of the member 43. In order to permit free horizontal shifting of the member 44 relatively to the member 43, it may be desirable, after the channel members 29 and 44 are locked together by the clamp rods 32, to relax somewhat the pressure which is exerted by the member 43, through action of the jacks 37—37, upon the member 44.

After the stockings clamped between the upper and lower die assemblies have been suitably heat treated in the autoclave 23, the wheel carriage supporting the clamp assembly is shifted out of the autoclave to its original position within the framework 13, the member 44 being thereupon re-engaged with the member 43 so that upon elevation of the latter by the jacks 37—37 the upper die assembly may be raised sufficiently to permit removal of the treated stockings from the lower die assembly. Of course, before the upper die assembly may be separated from the lower die assembly for removal of the stockings therebetween, the clamp rods 32 must be disengaged from the member 44.

It has been found that stockings processed by the apparatus of the present invention and in accordance with the procedure hereinbefore described have a greatly increased coursewise elasticity throughout their full length to thereby better and more neatly fit the leg of the wearer, this characteristic being obtained by reason of the permanent setting of the interknitted loops of the stocking fabric to such walewise elongated shape that their resistance to coursewise stretch is materially increased while at the same time they tend constantly to contract the stocking into form to snugly fit the wearer's leg.

It will be understood that the procedure is generally the same as that described in the Livingston Patent No. 2,591,566 hereinbefore referred to, namely, in that the stocking in the greige is subjected to the stretching operation performed by the apparatus of the present invention immediately following the initial presetting treatment conventional in the manufacture of stockings knitted of nylon and other such thermoplastic yarns. Normally, the temperature employed for permanentizing the loops of the stocking fabric into their desired walewise elongated and coursewise contracted shape is somewhat higher than that employed for initially presetting the stocking to shape, the permanentizing temperature being preferably of a range from 240 to 400 degrees F.

The present invention is, of course, applicable to the treatment of seamless hosiery as well as full-fashioned hosiery, and it is applicable also to other articles knitted of thermoplastic yarns, such as, nylon, which are intended to be form-fitting in shape. The present invention is, however, especially advantageous as applied to full-fashioned hosiery which is characterized by the provision of a rear seam extending longitudinally the full length of the stocking. By limiting the walewise stretch of the stocking to the portion thereof which terminates short of the rear seam area of the stocking, said area remains relatively relaxed as in the conventionally produced stocking, in consequence of which there is no tendency for the seam to become snaky or for it to pull the stocking out of shape. Similarly, by relaxing the interknitted loops in the region of the front fold line of the stocking, there is no tendency for the stocking fabric to become biased or scalloped in its front region. Also, by relaxing the stocking fabric in the regions of its shin fold and its longitudinally extending rear seam and so confining the walewise stretching of the stocking to only that portion thereof which extends between the shin fold and rear seam regions, the overall length of the finished stocking is not appreciably increased and in fact approximates that of a conventionally produced stocking.

It will be understood, of course, that the complementally formed corrugations of the interengaging die-plates 54 and 58 may be die-cast or stamped of any suitable material which presents a smooth surface which will not snag the fabric of the stocking and which has good heat transfer properties to insure quick distribution of heat uniformly throughout the stocking or stockings clamped and stretched between the die-plates. Where the stockings are to be treated in an autoclave having a steam or vapor atmosphere, it may be desirable to provide the die-plates with a series of apertures 87 (see Figures 4 to 6) spaced along the corrugated portions thereof in order to relieve the stockings clamped between the die-plates of any condensation which may form upon withdrawal of the stockings from the autoclave.

It is important to note that in the operation of the apparatus as just described it is not always necessary, and in certain instances it may not be desirable, for the marginal edges of the stockings S to be immovably clamped between the flat marginal surfaces of the upper and lower plates 54 and 58. Such clamping of the marginal edges of the stockings is effected only where it is desired to hold the stocking against any substantial coursewise contraction, in which case the stitch deformation is confined only to that central region or portion of the stockings S which is oppositely engaged by the inter-nesting corrugations of the upper and lower die-plates. It may be that when the stretching force applied by the inter-nesting corrugations is so confined to the central region of the stockings the interknitted loops of said region may have their bight portions more or less squared off instead of being curved to a small radius. However, whether or not the marginal edges are clamped between the die-plates, the interknitted loops of the fabric engaged between the inter-nested corrugations of the die-plates are so changed from their originally knitted conformation that when they are subsequently subjected to heat to permanently set them to their changed form, the coursewise elasticity of the stocking fabric is materially increased.

It will be understood, of course, that the present invention is susceptible of various changes and modifications which may be made from time to time without departing from the general principles or real spirit thereof, and it is accordingly intended to claim the same broadly, as well as specifically, as indicated in the appended claims.

What is claimed as new and useful is:

1. In an apparatus for producing form-fitting articles of wearing apparel knitted of thermoplastic yarn, means for supporting the knitted article in substantially unstretched condition with its opposite ends securely held to prevent lengthwise contraction of the article, means for imparting to the fabric of the article extending between its held ends a walewise stretch to increase the walewise length and decrease the coursewise width of the interknitted loops of said fabric as compared with the length and width of said loops formed upon the knitting machine, and means for subjecting the article in its walewise stretched condition to heat whereby to permanentize the stretched loops to their walewise elongated and coursewise contracted shape.

2. In an apparatus for producing form-fitting articles of wearing apparel knitted of thermoplastic yarn, means for supporting the knitted article in substantially flat, unstretched condition with its opposite ends held securely to prevent lengthwise contraction of the article, and means for imparting to the fabric of the article extending between its held ends a predeterminedly localized stretch to increase in selected areas of said fabric the walewise length and decrease the coursewise width of the interknitted loops as compared with the length and width of said loops originally formed upon the knitting machine.

3. In an apparatus for producing hosiery knitted of thermoplastic yarn, means for supporting the knitted hosiery in substantially unstretched, flat condition with its opposite ends held securely to prevent walewise contraction thereof, and means for stretching walewise only those portions of the hosiery which extend between the shin-fold and rear seam regions of the hosiery whereby to increase in said portions of the hosiery the walewise length and decrease the coursewise width of their interknitted loops as compared with the length and width of the loops forming said shin-fold and rear seam regions of the hosiery.

4. In an apparatus for producing hosiery knitted of thermoplastic yarn, means for supporting the knitted hosiery in substantially unstretched, flat condition with its opposite ends held securely to prevent walewise contraction thereof, means for stretching walewise only those portions of the hosiery which extend between the shin-fold and rear seam regions of the hosiery whereby to increase in said portions of the hosiery the walewise length and decrease the coursewise width of their interknitted loops as compared with the length and width of the loops forming said shin-fold and rear seam regions of the hosiery, and means for setting to permanent shape and form the walewise stretched and coursewise contracted interknitted loops.

5. In an apparatus for producing form-fitting articles of wearing apparel knitted of thermoplastic yarns, a pair of relatively movable die assemblies arranged in superposed parallel relation and respectively provided with complementally formed intermeshing corrugations, means for clamping the article to one of said die assemblies to support the same with its main body portion in flattened form and overlying substantially flatwise the corrugations of its said supporting die assembly, and means for pressing said die assemblies together whereby to effect intermeshing of their complementally formed corrugations and so stretch the fabric of the article disposed therebetween.

6. In an apparatus for producing form-fitting articles of wearing apparel knitted of thermoplastic yarns, a pair of relatively movable die assemblies arranged in superposed parallel relation and respectively provided with complementally formed intermeshing corrugations, means for clamping the article to one of said die assemblies to support the same with its main body portion in flattened form and overlying substantially flatwise corrugations of its said supporting die assembly, and means for pressing said die assemblies together whereby to effect intermeshing of their complementally formed corrugations and so stretch the fabric of the article disposed therebetween, said complementally formed corrugations being of such size and conformation as to stretch only predeterminedly selected areas of the knitted fabric of the article.

7. In an apparatus for producing form-fitting articles of wearing apparel knitted of thermoplastic yarns, a pair of relatively movable die assemblies arranged in superposed parallel relation and respectively provided with complementally formed intermeshing corrugations, means for clamping the article to one of said die assemblies to support the same with its main body portion in flattened form and overlying substantially flatwise corrugations of its said supporting die assembly, and means for pressing said die assemblies together whereby to effect intermeshing of their complementally formed corrugations and so stretch the fabric of the article disposed therebetween, said complementally formed corrugations extending generally transversely of the longitudinal length of the article to be stretched.

8. In an apparatus for producing form-fitting articles of wearing apparel knitted of thermoplastic yarns, a pair of relatively movable die assemblies arranged in superposed parallel relation and respectively provided with complementally formed intermeshing corrugations, means for clamping the article to one of said die assemblies to support the same with its main body portion in flattened form and overlying substantially flatwise corrugations of its said supporting die assembly, and means for pressing said die assemblies together whereby to effect intermeshing of their complementally formed corrugations and so stretch the fabric of the article disposed therebetween, said complementally formed corrugations extending generally transversely of the longitudinal length of the article to be stretched and being each of an overall effective length less than the width of the fabric of the article overlying the same, whereby upon intermeshing of the complementally formed corrugations of the die assemblies at least one of the longitudinally extending marginal portions of the article is not subjected to stretching.

9. In an apparatus as defined in claim 5 for producing full-fashioned hosiery knitted of thermoplastic yarn and having a longitudinally extending rear seam, wherein the complementally formed corrugations of said die assemblies extend coursewise of the hosiery to be stretched between said assemblies and wherein corresponding ends of said corrugations terminate several wale lines short of the longitudinally extending rear seam of the hosiery.

10. In an apparatus as defined in claim 5 for producing hosiery knitted of thermoplastic yarn wherein the complementally formed corrugations of said die assemblies extend coursewise of the hosiery to be stretched between said assemblies and wherein opposite corresponding ends of said corrugations respectively terminate several wale lines short of the opposite longitudinally extending marginal edges of the hosiery.

11. In an apparatus for producing form-fitting articles of wearing apparel knitted of thermoplastic yarn, a pair of relatively movable die members respectively provided with complementally formed intermeshing elements adapted, when intermeshed, to stretch the fabric of an article interposed therebetween, said elements extending generally in a direction transverse to the direction of stretch of the article, means for preliminarily securing opposite ends of the article to corresponding ends of one of said die members for supporting the article in relaxed condition flatwise across the stretching elements of the supporting die member, and means for pressing said die members together to effect intermeshing of their complementally formed elements to thereby stretch the fabric of the article interposed therebetween.

12. In an apparatus for producing form-fitting articles of wearing apparel knitted of thermoplastic yarn, a pair of relatively movable die members respectively provided with complementally formed intermeshing elements adapted, when intermeshed, to stretch the fabric of an article interposed therebetween, said elements extending generally in a direction transverse to the direction of stretch of the article, means for preliminarily securing opposite ends of the article to corresponding ends of one of said die members for supporting the article in relaxed condition flatwise across the stretching elements of the supporting die member, means for pressing said die members together to effect intermeshing of their complementally formed elements to thereby stretch the fabric of the article interposed therebetween, and means for subjecting the article stretched between the intermeshed elements of said die members to heat whereby to permanentize the stretched condition thereof.

13. In an apparatus as defined in claim 12 for producing hosiery knitted of thermoplastic yarn wherein the complementally formed stretching elements of said die members extend coursewise of the fabric of the hosiery interposed between said die members and are each of a coursewise dimension less then the coursewise width of the hosiery, whereby marginal portions of the hosiery remain relatively relaxed and unstretched when the hosiery is oppositely engaged by the intermeshing elements of the die members.

14. In an apparatus for producing form-fitting articles of wearing apparel knitted of thermoplastic yarn, a pair of relatively movable die members respectively provided with complementally formed intermeshing elements adapted, when intermeshed, to stretch the fabric of an article interposed therebetween, said elements extending generally in a direction transverse to the direction of stretch of the article, means for preliminarily securing opposite ends of the article to corresponding ends of one of said die members for supporting the article in relaxed condition flatwise across the stretching elements of the supporting die member, means for pressing said die members together to effect intermeshing of their complementally formed elements to thereby stretch the fabric of the article interposed therebetween, and means for releasably locking said die members together.

15. In an apparatus for producing form-fitting articles of wearing apparel knitted of thermoplastic yarn, a pair of relatively movable die members respectively provided with complementally formed intermeshing elements adapted, when intermeshed, to stretch the fabric of an article interposed therebetween, said elements extending generally in a direction transverse to the direction of stretch of the article, means for preliminarily securing opposite ends of the article to corresponding ends of one of said die members for supporting the article in relaxed condition flatwise across the stretching elements of the supporting die member, means for pressing said die members together to effect intermeshing of their complementally formed elements to thereby stretch the fabric of the article interposed therebetween, means for releasably locking said die members together, and means for transferring the interlocked die members with the stretched article interposed therebetween as a unitary assembly into a chamber having a heated atmosphere for therein permanentizing the stretched condition of the article.

16. In an apparatus for producing form-fitting articles of wearing apparel knitted of thermoplastic yarn, a pair of relatively movable die members respectively provided with complementally formed intemeshing elements adapted, when intermeshed, to stretch the fabric of an article interposed therebetween, said elements extending generally in a direction transverse to the direction of stretch of the article, means for preliminarily securing opposite ends of the article to corresponding ends of one of said die members for supporting the article in relaxed condition flatwise across the stretching elements of the supporting die member, and means for pressing said die members together to effect intermeshing of their complementally formed elements to thereby stretch the fabric of the article interposed therebetween, said means for preliminarily securing the article in relaxed condition to the supporting die member therefor including a plurality of clamp shoes which are each resiliently pressed into holding engagement with the article by the pressure of the die member brought into engagement with the article-supporting die member.

17. In an apparatus for producing form-fitting articles of wearing apparel knitted of thermoplastic yarn, a pair of relatively movable die members respectively provided with complementally formed intermeshing elements adapted, when intermeshed, to stretch the fabric of an article interposed therebetween, said elements extending generally in a direction transverse to the direction of stretch of the article, means for preliminarily securing opposite ends of the article to corresponding ends of one of said die members for supporting the articles in relaxed condition flatwise across the stretching elements of the supporting die member, means for pressing said die members together to effect intermeshing of their complementally formed elements to thereby stretch the fabric of the article interposed therebetween, means for releasably locking said die members together, means for transferring the interlocked die members with the stretched article interposed therebetwen as a unitary assembly into a chamber having a heated atmosphere for therein permanentizing the stretched condition of the article, and means for effecting release of said interlocked die members from said pressing means.

18. In an apparatus for producing form-fitting articles of wearing apparel knitted of thermoplastic yarn, a pair of relatively movable die members respectively provided with complementally formed intermeshing elements adapted, when intermeshed, to stretch the fabric of an article interposed therebetween, said elements extending generally in a direction transverse to the direction of stretch of the article, means for preliminarily securing opposite ends of the article to corresponding ends of one of said die members for supporting the article in relaxed condition flatwise across the stretching elements of the supporting die member, means for pressing said die members together to effect intermeshing of their complementally formed elements to thereby stretch the fabric of the article interposed therebetween, means for releasably locking said die members together, means for transferring the interlocked die members with the stretched article interposed therebetween as a unitary assembly into a chamber having a heated atmosphere for therein permanentizing the stretched condition of the article, and means for effecting disengagement of said interlocked die members from and their re-engagement with said pressing means upon horizontal shifting movement of the former relatively to the latter.

19. In an apparatus for producing form-fitting articles of wearing apparel knitted of thermoplastic yarn, a pair of relatively movable die members respectively provided with complementally formed intermeshing elements adapted, when intermeshed, to stretch the fabric of an article interposed therebetween, said elements extending generally in a direction transverse to the direction of stretch of the article, means for preliminarily securing opposite ends of the article to corresponding ends of one of said die members for supporting the article in relaxed condition flatwise across the stretching elements of the supporting die member, means for pressing said die members together to effect intermeshing of their complementally formed elements to thereby stretch the fabric of the article interposed therebetween, means for releasably locking said die members together, and means for transferring the interlocked die members with the stretched article interposed therebetween as a unitary assembly into a chamber having a heated atmosphere for therein permanentizing the stretched condition of the article, said last-mentioned means including a wheeled supporting carriage for the interlocked die members and tracks upon which said carriage is movable.

20. In an apparatus for producing form-fitting articles of wearing apparel knitted of thermoplastic yarn, a pair of relatively movable die members respectively provided with complementally formed intermeshing elements adapted, when intermeshed, to stretch the fabric of an article interposed therebetween, said elements extending generally in a direction transverse to the direction of stretch of the article, means for preliminarily securing opposite ends of the article to corresponding ends of one of said die members for supporting the article in relaxed condition flatwise across the stretching elements of the supporting die member, and means for pressing said die members together to effect intermeshing of their complementally formed elements to thereby stretch the fabric of the article interposed therebetween, said die members being disposed in substantially horizontally extending, parallel planes and said pressing means being operative to vertically raise and lower one of said die members relatively to the other.

21. A method of producing stockings and other form-fitting articles knitted of thermoplastic yarn, which comprises supporting the article in flattened, relaxed condition with its opposite ends securely held to prevent lengthwise contraction thereof, in then imposing a longitudinal stretching force upon a selected portion of the article fabric to substantially increase the length and decrease the width of the interknitted loops of the fabric portion as compared with the length and width of the interknitted loops of the remaining portion of the article fabric, and in then permanentizing the set of all of the interknitted loops of the article by subjecting it to heat.

22. A method of producing hosiery knitted of thermoplastic yarn which comprises supporting the hosiery in flattened, relaxed condition with its opposite ends securely held to prevent walewise contraction thereof, in then imposing a walewise stretching force upon the hosiery, said stretching force being limited to an area of the hosiery which extends coursewise to lines respectively spaced several wales inwardly from the opposite longitudinally extending marginal edges of the hosiery, to thereby increase the walewise length and decrease the coursewise width of the interknitted loops of said limited area as compared with the walewise length and coursewise width of the interknitted loops in the marginal portions of the hosiery, and in thereafter subjecting the stretched hosiery to a heating medium sufficiently high and for a period sufficiently long to permanentize the set of all of the loops of the hosiery.

23. A method of producing full-fashioned hosiery knitted of thermoplastic yarn and having a longitudinally extending rear seam which comprises initially supporting the hosiery in substantially flat, relaxed condition with its opposite ends securely held to prevent walewise contraction thereof, in then imposing a walewise stretching force upon a limited portion of the hosiery which extends coursewise to wale lines spaced inwardly from opposite sides of the longitudinal seam of the hosiery to thereby increase the coursewise elasticity of the stretched portion of the hosiery substantially beyond that of the seamed portion thereof, and in thereafter subjecting the hosiery to heat to permanentize the stretched condition thereof.

24. A method of producing stockings knitted of thermoplastic yarn and having a rear seam etxending longitudinally from the welt to the toe of the stocking which comprises imposing a walewise stretching force upon all of the stocikng fabric except for a limited portion thereof which includes its seam, and in thereafter subjecting the stocking to heat to permanentize the set of the interknitted loops of the stretched portion of the stocking to thereby increase the coursewise elasticity of the stocking substantially beyond that of the seamed portion thereof.

25. A method of producing stockings knitted of thermoplastic yarn which comprises folding the stocking into flattened form and holding it while in such form in relatively relaxed, smooth condition under just sufficient tension to substantially free it of wrinkles, in then imposing a walewise stretching force upon all of the stocking fabric except for those portions thereof which respectively include the opposite longitudinally extending folded edges of the stocking and a limited number of wale lines disposed immediately adjacent opposite sides of each folded edge, and in thereafter permanentizing the stretched condition of the stocking by subjecting it to heat.

26. A method of producing stockings and other form fitting articles of wearing apparel knitted of thermoplastic yarn which comprises holding the article in flattened, relatively relaxed condition under just sufficient tension to substantially free it of wrinkles, in then imposing a walewise stretching force upon all of the stocking fabric except for those portions thereof which respectively include the opposite longitudinally extending folded edges of the article and a limited number of contiguous wale lines disposed to opposite sides of each folded edge, while simultaneously holding the article throughout its longitudinal extent against coursewise contraction, and in then permanentizing the set of the interknitted loops of the article fabric by subjecting the same to heat.

27. A method of producing stockings knitted of thermoplastic yarn and having a longitudinally extending rear seam which comprises folding the stocking flat so that its seam defines the rear fold line thereof and holding the stocking in its flattened condition under just sufficient tension to substantially free it of wrinkles, in then imposing a walewise stretching force upon all of the stocking fabric except for those limited portions thereof which respectively include front and rear fold lines thereof, and in thereafter permanentizing the set of the interknitted loops of the stocking fabric by subjecting the same to heat.

28. A method of producing stockings knitted of thermoplastic yarn and having a longitudinally extending rear seam which comprises folding the stocking flat so that its seam defines the rear fold line thereof and holding the stocking in its flattened condition under just sufficient tension to substantially free it of wrinkles, while holding the stocking against substantial coursewise contraction thereof, in then imposing a walewise stretching force upon all of the stocking fabric except for those limited portions thereof which respectively include front and rear fold lines thereof, and in thereafter permanentizing the set of the interknitted loops of the stocking fabric by subjecting the same to heat.

29. A form-fitting article of wearing apparel knitted of heat-settable thermoplastic yarn to provide a main body fabric having interknitted loops arranged in successive courses thereof, adjoining loops in successive courses forming a major portion of the body fabric being all stretched and permanently set in the fabric to decrease the coursewise dimension of the stocking below that normally provided by the knitting machine, the stretched loops being limited to those which extend coursewise about the opposite sides of the article between wale lines spaced from the front and rear fold lines of the article.

30. A stocking having a main body portion knitted of heat-settable thermoplastic yarn and comprising interknitted loops arranged in successive courses, said stocking having a longitudinally extending rear seam and being characterized in that adjoining loops in successive courses thereof which form a major portion of the body fabric of the stocking are permanently set to a form and shape substantially different from their form and shape as originally produced upon the knitting machine to thereby increase the coursewise elasticity of the body fabric, the loops so set to substantially different form and shape being restricted to those which extend coursewise about the stocking from wale lines respectively spaced a limited number of wales from opposite sides of the stocking seam.

31. A stocking having a main body portion knitted of heat-settable thermoplastic yarn and comprising interknitted loops arranged in successive courses, said stocking having a longitudinally extending rear seam and being characterized in that adjoining loops in successive courses thereof which form a major portion of the body fabric of the stocking are each permanently set to a walewise length greater and a coursewise width less than the length and width of the originally knitted corresponding loop, the loops so permanently set to increased length and decreased width being restricted only to those which are not confined within the longitudinally extending seamed portion of the stocking.

32. A stocking having a main body portion knitted of heat-settable thermoplastic yarn and comprising interknitted loops arranged in successive courses, said stocking having a longitudinally extending rear seam and being characterized in that adjoining loops in successive courses thereof which form a major portion of the body fabric of the stocking are each permanently set to a walewise length greater and a coursewise width less than the length and width of the originally knitted corresponding loop, the loops so permanently set to increased length and decreased width being restricted to only those which are not confined within the longitudinally extending rear seam and front fold line portions of the stocking.

No references cited.